July 20, 1937.  A. R. PRIBIL  2,087,299
TRAILER
Filed July 22, 1935  2 Sheets-Sheet 2
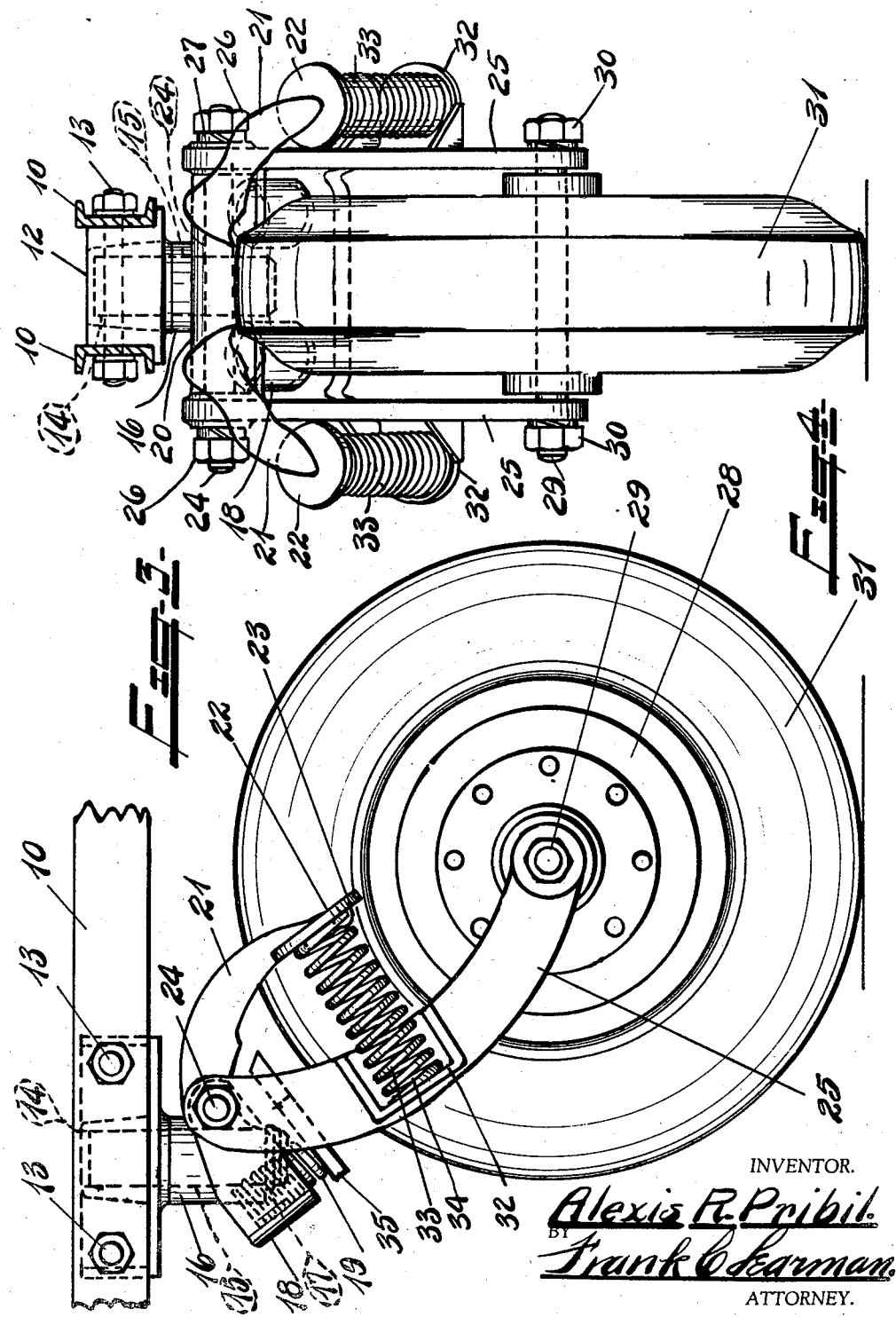
INVENTOR.
Alexis R. Pribil.
BY Frank C. Searman.
ATTORNEY.

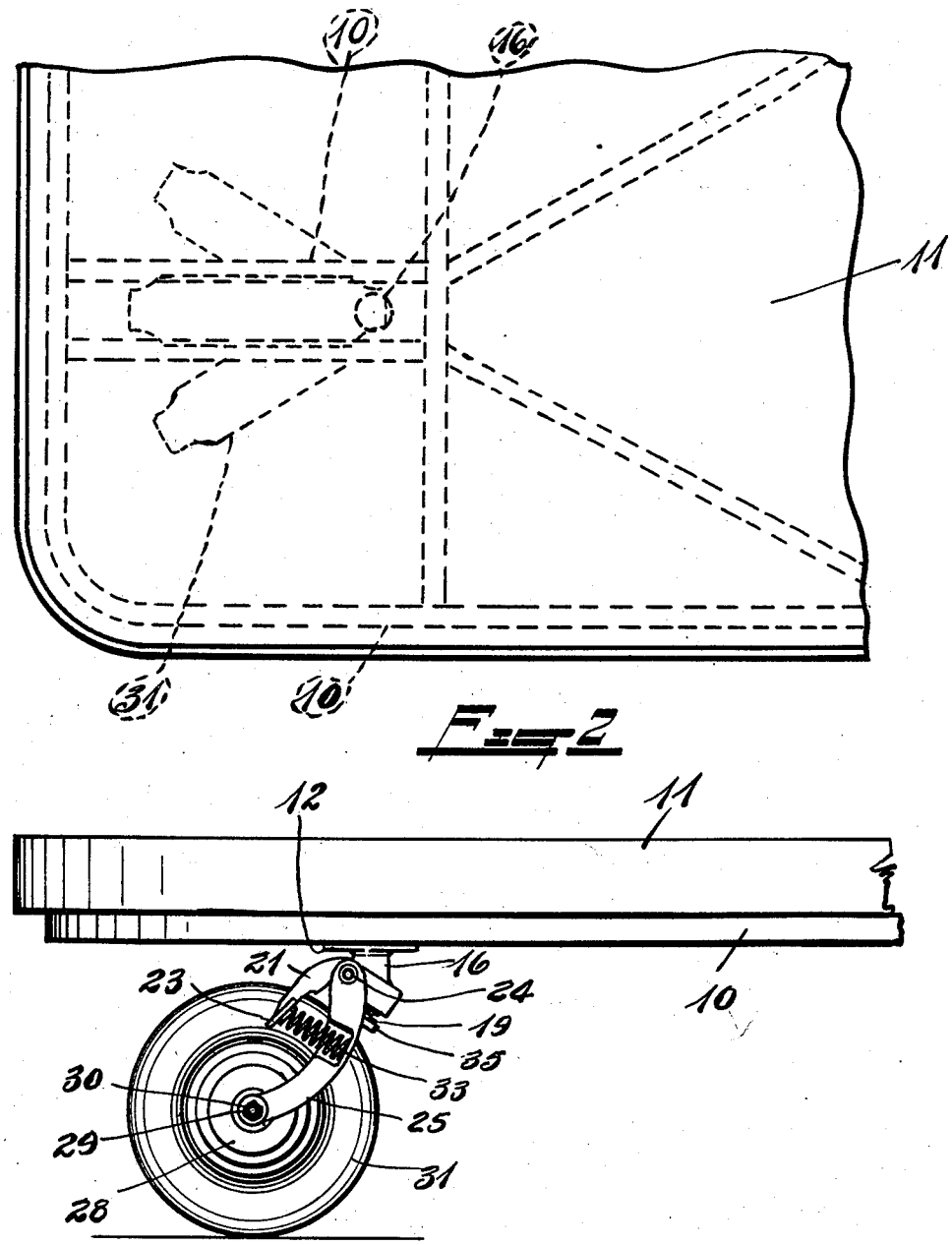

Patented July 20, 1937

2,087,299

UNITED STATES PATENT OFFICE 2,087,299

TRAILER

Alexis R. Pribil, Saginaw, Mich.

Application July 22, 1935, Serial No. 32,548

7 Claims. (Cl. 280—33.4)

This invention relates to vehicle construction, and particularly to a construction for a trailing unit adapted to be connected to and drawn by a power vehicle.

One of the prime objects of the invention is to provide a trailing unit of simple, practical, and rugged construction, which can be easily and quickly attached or detached, and which is economical to manufacture and assemble.

Another object is to provide a trailing unit which backs as perfectly as it travels forwardly, and at any speed, and which cannot get out of line and hinder turning or backing.

A further object is to provide a rigid frame with a knee-action swiveled wheel mounting in which one set of springs absorbs the recoil of the main vehicle springs, assuring smooth and easy riding with all loads.

A still further object is to provide a trailer unit which is perfectly balanced, which is always in perfect alignment with the power vehicle, and which will not sway at high speeds.

A further object still is to provide a very economical trailer construction having a full revolving wheel assembly, which can be readily manufactured, which can be stored in a minimum of space, and which in use performs and handles exactly the same as if it were an extension of the driving vehicle.

With the above and other objects in view, the present invention consists in the combination and arrangement of parts, hereinafter more fully described, illustrated in the accompanying drawings, and particularly pointed out in the appended claims, it being understood that changes may be made in the form, size, proportion, and minor details of construction, without departing from the spirit, or sacrificing any of the advantages of the invention.

In the drawings—

Fig. 1 is a fragmentary side elevation of my improved trailing unit,

Fig. 2 is a fragmentary top plan view,

Fig. 3 is an enlarged fragmentary view of the swiveled wheel assembly and mounting, and Fig. 4 is a rear view thereof.

Referring now to the drawings in which I have shown the preferred embodiment of my invention, the numeral 10 indicates the frame of the trailer; this is of rigid construction, being preferably formed of channels or other steel shapes welded together in the usual manner, and a body 11 is mounted on the frame and in which the load is carried, the side members of the frame projecting beyond the front end of the body, and suitable swiveling means is provided for connecting each side member to a power vehicle (not shown), so that the trailer may be attached to the bumper or other portion of the framework thereof.

The wheel assembly shown in detail in Figs. 3 and 4 of the drawings is connected to the lower face of the frame and comprises a bearing block 12 secured to the frame 10 by means of bolts 13, said block being formed with a centrally disposed socket 14 in which the vertically disposed shaft or stem 15 is mounted, said stem depending below the frame, and a bracket member 16 is journaled thereon and is held in position by means of spring washers 17 in the conventional manner.

Spaced apart, angularly disposed recoil spring sockets 18 are formed integral with the bracket 16, and coil springs 19 are mounted therein and serve to cushion and check the rebounds in a manner to be presently described. An offset hub section 20 is also formed integral with the bracket, and spaced apart, outwardly projecting, over-hanging arms 21 are formed integral therewith, these arms terminating in a disc shaped cap 22, having a pilot boss 23 on the inner face thereof.

The hub section 20 is longitudinally bored to receive the bolt 24, and the fork 25 is pivotally connected thereto, the upper ends of said fork being also bored to accommodate said bolt, and nuts and washers 26 and 27 respectively serve to complete the mounting.

The ground engaging wheel or caster member 28 is mounted on and between the forks 25, and is provided with a spindle 29 which is mounted in suitable openings provided in said fork, nuts 30 being provided for securing it in position, and the pneumatic tire 31 insures easy riding and smoothness of operation.

Spring seats 32 are also provided on the fork 25, and main springs 33 are mounted therein, a boss or pilot 34 being provided in each seat and serves to center the lower ends of the springs, the upper ends of these springs engaging the pilots 23 of the disc shaped ends of the over-hanging arms 21 so that as the vehicle travels over obstacles, rough and uneven roads, the springs will flex accordingly.

An angularly disposed flat rib or plate 35 is cast integral with and adjacent the upper end of the fork and forms a bearing for the recoil springs 19, and when the wheel passes over a bump or other obstruction, the main springs 33 will be compressed, and the shock will be transmitted through the arms 21 to the recoil springs 19, so that definitely better riding qualities are assured and sharp hammer blows or shocks are thus absorbed, making also for longer wear, elimination of breakage, and smoother riding. The wheel is free to swivel and turn to accommodate the twists and/or turns of the driven vehicle, it is fully universal, and can be readily and quickly attached or detached as desired.

From the foregoing description it will be obvious that I have perfected a very simple, practical, rugged, low cost trailing unit, which is very flexible, light in weight, and which has sufficient capacity to accommodate any reasonable load which can be handled by the driven vehicle.

What I claim is:

1. In a trailing unit of the character described, in combination, a frame, a stem rigidly secured thereto, a bracket revolubly mounted thereon, and including a sleeve, offset sockets on said bracket, overhanging, angularly disposed arms projecting from the opposite side of the bracket, a trailing fork and wheel assembly pivotally secured to the bracket at a point spaced rearwardly from the vertical axis thereof and adapted to pivot about a horizontal axis, spring seats on said fork at a point intermediate its length, springs interposed between said socket and the one set of spring seats, and opposed springs interposed between the fork and the overhanging, angularly disposed arms.

2. In a trailing unit of the class described, in combination, a rigid frame, a housing secured thereto, a vertically disposed stem secured in the housing, a bracket pivotally and removably mounted on the stem, and mounted to pivot about a vertical axis, offset spring sockets formed on said bracket, angularly disposed arms projecting from the opposite side thereof, a trailing fork and wheel assembly pivotally connected to the bracket and mounted to pivot about a horizontal axis, spring seats provided on the fork, at a point intermediate its length and opposed sets of springs bearing against opposite sides of the fork and engaging the sockets and arms respectively.

3. In an apparatus of the character described, in combination, a vehicle frame adapted to be attached to another vehicle, a bracket revolvably secured to the underside of the frame, a rearwardly curved fork having a horizontally disposed pivotal connection to said bracket and including a wheel assembly, arms on said bracket and extending over said fork and provided with spring seats thereon, a socket on the forward side of said bracket, spaced apart spring seats on the fork and springs interposed between the arms and curved fork, and between the socket and fork respectively, so that the recoil of the rear resilient member is absorbed by the front resilient member.

4. In an apparatus of the character described, in combination, a rigid vehicle frame adapted to be attached at spaced apart points to another vehicle, a vertically disposed spindle secured to the underside of the frame, a bracket revolvably mounted on said spindle, spring seats on said bracket and disposed in the front and in the rear thereof, a rearwardly curved fork having a horizontally disposed pivotal connection to the bracket and including a wheel assembly, spring seats on said fork and springs interposed between the front spring seat and the fork, and between the rear spring seat and the fork respectively, so that the recoil of one set of springs is absorbed by the opposite set of springs.

5. In a trailer apparatus of the character described, in combination, a rigid frame, a vertically disposed stem, a bracket revolvably mounted on the stem, rearwardly projecting arms on said bracket and terminating in spring seats, sockets on the opposite side of the bracket, a trailing fork and wheel assembly having a horizontal pivotal connection to said bracket, spaced apart spring seats on said fork and springs interposed between the spring seats on the arms and fork and between the sockets and fork respectively, so that one set of springs absorbs the recoil from the opposite set of springs.

6. In a trailer apparatus of the character described, in combination, a rigid frame, a vertically disposed stem secured to the underside of the frame, a bracket rotatably mounted on said stem and including opposed spring engaging means provided on the front and rear sides thereof, a rearwardly curved fork having a horizontal pivotal connection to said bracket and including spring seats, said fork being mounted to pivot about a horizontal axis, and opposed springs interposed between said fork and said front and rear spring engaging means, whereby one set of springs absorbs the recoil of the opposite set of springs.

7. In a single wheel trailer apparatus of the character described, in combination, a rigid frame, a bracket detachably secured to the under side of the frame to pivot about a substantially vertical axis, opposed, angularly disposed, outwardly projecting, spring engaging members provided on the front and rear sides of said bracket, a rearwardly curved fork including a wheel assembly having a horizontal pivotal connection to the bracket, and opposed springs interposed between said front and rear spring engaging members and said fork in such manner that the recoil of one set of springs is absorbed by the opposite set of springs.

ALEXIS R. PRIBIL.